United States Patent
Barna et al.

(10) Patent No.: US 8,314,867 B2
(45) Date of Patent: Nov. 20, 2012

(54) POWER SAVINGS WITH MULTIPLE READOUT CIRCUITS

(75) Inventors: Sandor L. Barna, Pasadena, CA (US); Guy Moffat, Manlius, NY (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/603,151

(22) Filed: Oct. 21, 2009

(65) Prior Publication Data

US 2010/0110250 A1     May 6, 2010

Related U.S. Application Data

(63) Continuation of application No. 10/745,611, filed on Dec. 29, 2003, now Pat. No. 7,619,669.

(51) Int. Cl.
    *H04N 3/14*     (2006.01)
    *H04N 5/335*     (2006.01)
    *H04N 9/04*     (2006.01)
    *H04N 9/083*     (2006.01)

(52) U.S. Cl. ........................................ 348/283; 348/323
(58) Field of Classification Search .................. 348/283, 348/333.01, 333.11, 333.13
See application file for complete search history.

(56) References Cited

U.S. PATENT DOCUMENTS

| | | | |
|---|---|---|---|
| 4,541,010 A | 9/1985 | Alston | |
| 5,262,871 A | 11/1993 | Wilder et al. | |
| 5,264,939 A * | 11/1993 | Chang | 348/322 |
| 5,565,913 A | 10/1996 | Matsui et al. | |
| 6,011,583 A | 1/2000 | Hieda et al. | |
| 6,222,175 B1 | 4/2001 | Krymski | |
| 6,466,265 B1 | 10/2002 | Lee et al. | |
| 6,512,858 B2 | 1/2003 | Lyon et al. | |
| 6,784,928 B1 | 8/2004 | Sakurai et al. | |
| 6,822,211 B2 | 11/2004 | Hagihara | |
| 6,961,088 B2 | 11/2005 | Kameshima et al. | |
| 7,012,644 B1 | 3/2006 | Herrera E. | |
| 7,068,316 B1 | 6/2006 | Pine | |
| 7,289,150 B2 | 10/2007 | Harada | |
| 7,408,443 B2 | 8/2008 | Nam | |
| 2002/0015101 A1 * | 2/2002 | Mead et al. | 348/333.01 |
| 2003/0043089 A1 | 3/2003 | Hanson et al. | |
| 2003/0146991 A1 | 8/2003 | Barna et al. | |
| 2003/0234884 A1 | 12/2003 | Nakada | |
| 2004/0041927 A1 | 3/2004 | Cho et al. | |

FOREIGN PATENT DOCUMENTS

| | | |
|---|---|---|
| EP | 1213916 A1 | 6/2002 |
| JP | 60254884 A | 12/1985 |

* cited by examiner

*Primary Examiner* — Nicholas Giles
*Assistant Examiner* — Gary C Vieaux
(74) *Attorney, Agent, or Firm* — Dickstein Shapiro LLP (57) ABSTRACT

An imager with a switch circuit located between, and connected to, the pixel array and associated readout chains. In one embodiment the switch is located within the column sample and hold circuitry; in another embodiment the switch is located between the column sample and hold circuitry and the readout chains. The switch circuit ensures that signals from the column sample and hold circuitry are directed to enabled readout chains, which allows selective enabling/disabling of readout chains. By disabling readout chains, the imager's power consumption is reduced.

16 Claims, 6 Drawing Sheets

POWER SAVINGS WITH MULTIPLE READOUT CIRCUITS

This application is a continuation of U.S. patent application Ser. No. 10/745,611, filed Dec. 29, 2003 now U.S. Pat. No. 7,619,669, the entirety of which is incorporated herein by reference.

FIELD OF THE INVENTION

The invention relates generally to imaging devices, and more particularly to an imager with a multiplexed pixel column architecture having multiple readout chains.

BACKGROUND

Imaging devices such as complementary metal oxide semiconductor (CMOS) imagers are commonly used in photo-imaging applications.

A CMOS imager circuit includes a focal plane array of pixel cells, each one of the cells including either a photogate, photoconductor or a photodiode overlying a substrate for accumulating photo-generated charge in the underlying portion of the substrate. A readout circuit is connected to each pixel cell and includes at least an output field effect transistor formed in the substrate and a charge transfer section formed on the substrate adjacent the photogate, photoconductor or photodiode having a sensing node, typically a floating diffusion node, connected to the gate of an output transistor. The imager may include at least one electronic device such as a transistor for transferring charge from the underlying portion of the substrate to the floating diffusion node and one device, also typically a transistor, for resetting the node to a predetermined charge level prior to charge transference.

In a CMOS imager, the active elements of a pixel cell perform the necessary functions of: (1) photon to charge conversion; (2) accumulation of image charge; (3) transfer of charge to the floating diffusion node accompanied by charge amplification; (4) resetting the floating diffusion node to a known state before the transfer of charge to it; (5) selection of a pixel for readout; and (6) output and amplification of a signal representing pixel charge. Photo charge may be amplified when it moves from the initial charge accumulation region to the floating diffusion node. The charge at the floating diffusion node is typically converted to a pixel output voltage by a source follower output transistor. The photosensitive element of a CMOS imager pixel is typically either a depleted p-n junction photodiode or a field induced depletion region beneath a photogate. For photodiodes, image lag can be eliminated by completely depleting the photodiode upon readout.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

Figure 1:
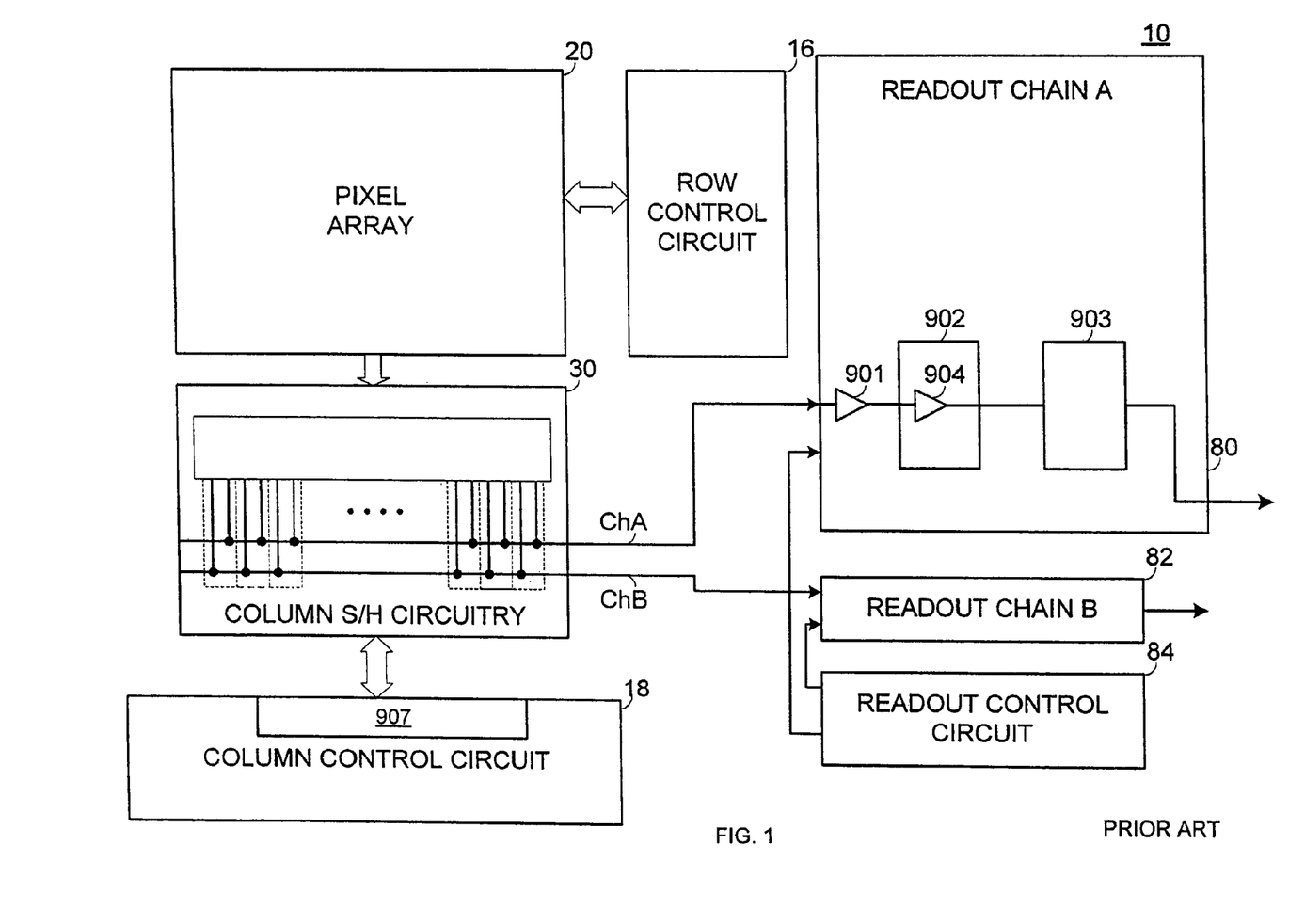
FIG. 1 is a block diagram of a CMOS imager.

A typical CMOS imager 10 is illustrated in FIG. 1. The imager 10 includes a pixel array 20 connected to column sample and hold (S/H) circuitry 30. The pixel array 20 comprises a plurality of pixels arranged in a predetermined number of rows and columns (e.g., M rows and N columns). In operation, the pixels of each row in the array 20 are all turned on at the same time by a row select line and the pixels of each column are selectively output by a column select line. A plurality of row and column lines are provided for the entire array 20.

The row lines are selectively activated by row control circuitry 16 in response to an applied row address. The column select lines are selectively activated by column control circuitry 18 in response to an applied column address. Thus, a row and column address is provided for each pixel. The CMOS imager 10 is operated by the row and column control circuits 16, 18, which controls the row and column circuitry for selecting the appropriate row and column lines for pixel readout. Column control circuit 18 includes a column decoder 907.

The CMOS imager 10 illustrated in FIG. 1 uses a dual channel readout architecture. That is, the imager 10 includes a first channel ChA and a second channel ChB for pixel image and reset signals (the "pixel signals") read out of the array 20. Each readout channel ChA, ChB is used to read out half the number of pixels connected to the column S/H circuitry 30. As is known in the art, once read out, the analog reset and pixel signals pass through a readout chain 80, 82 controlled by readout control circuitry 84. Each readout chain 80, 82 may include an amplifier 901 (FIG. 1), gain stage circuit 902 which includes a gain stage amplifier 904 (FIG. 1) and an analog-to-digital converter (ADC) 903 (FIG. 1), before being processed as digital signals by an image processor. Since each channel ChA, ChB contains its own readout chain 80, 82, there exists an offset and slight gain difference due to process mismatches.

Figure 2:
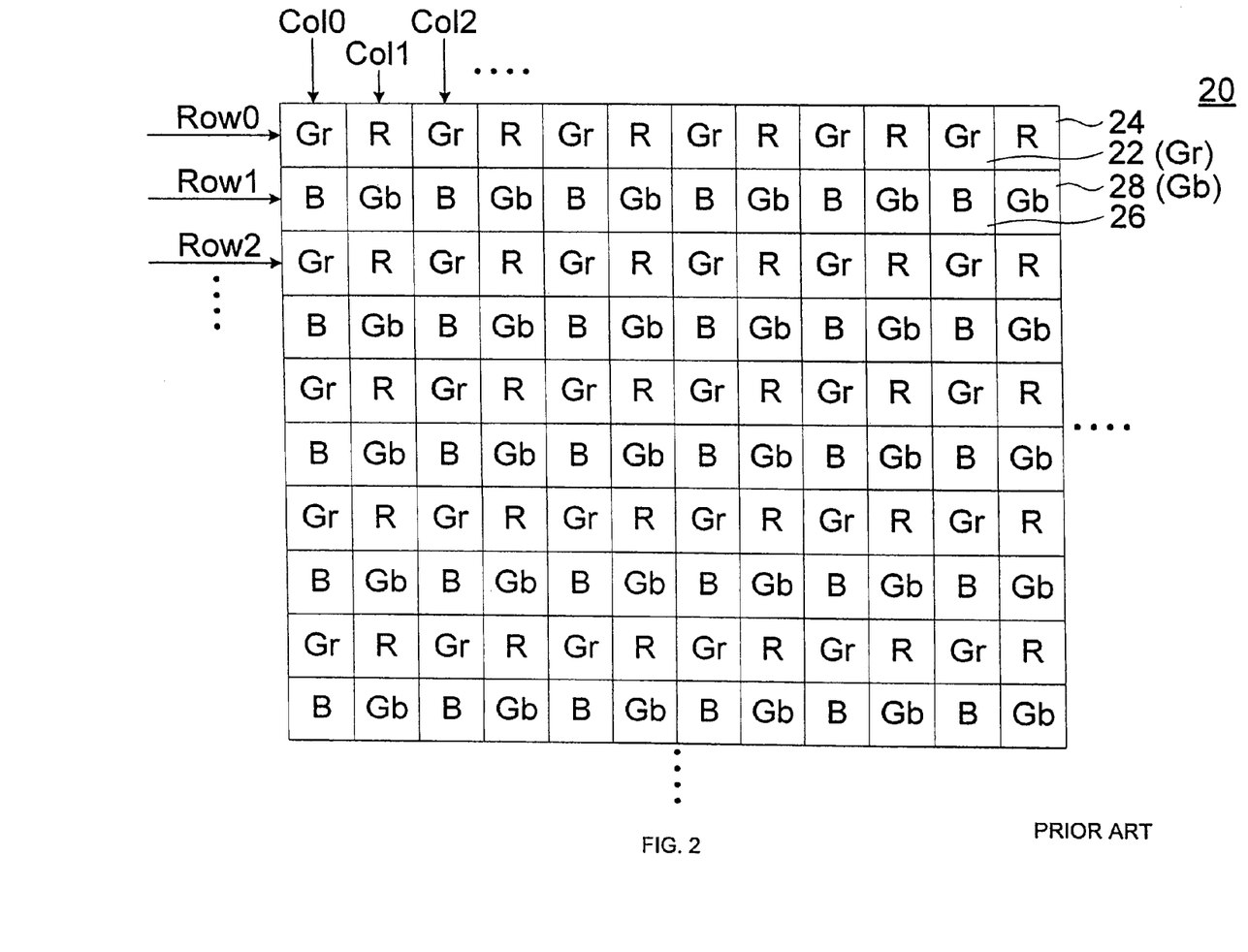
FIG. 2 illustrates a pixel array that may be used in the imager of FIG. 1.

Many imagers use the Bayer color filter array (CFA) scheme for its pixel arrays. Other imagers may use complementary filters having cyan, magenta, and yellow filters. FIG. 2 illustrates the Bayer scheme for the pixel array 20 illustrated in FIG. 1. Each row of pixels contains two types of CFA's. Row0, for example, contains alternating green 22 (designated as Gr) and red 24 (designated as R) pixels, while Row1 contains alternating blue 26 (designated as B) and green 28 (designated as Gb) pixels. To ensure that the green pixels 22, 28 (Gr, Gb) have the same offset and gain, the signals from the green pixels need to be transferred from the column S/H circuitry 30 to the same channel, e.g., ChA. Further in other aspects, digital correction may be applied to the signals to correct for any remaining offset which would require logic and circuitry not depicted in FIG. 2. Therefore, the first channel ChA will readout the signals from the green pixels 22, 28 (Gr, Gb) while the second channel ChB will readout the signals from the red and blue pixels 24, 26 (R, B).

Figure 3:
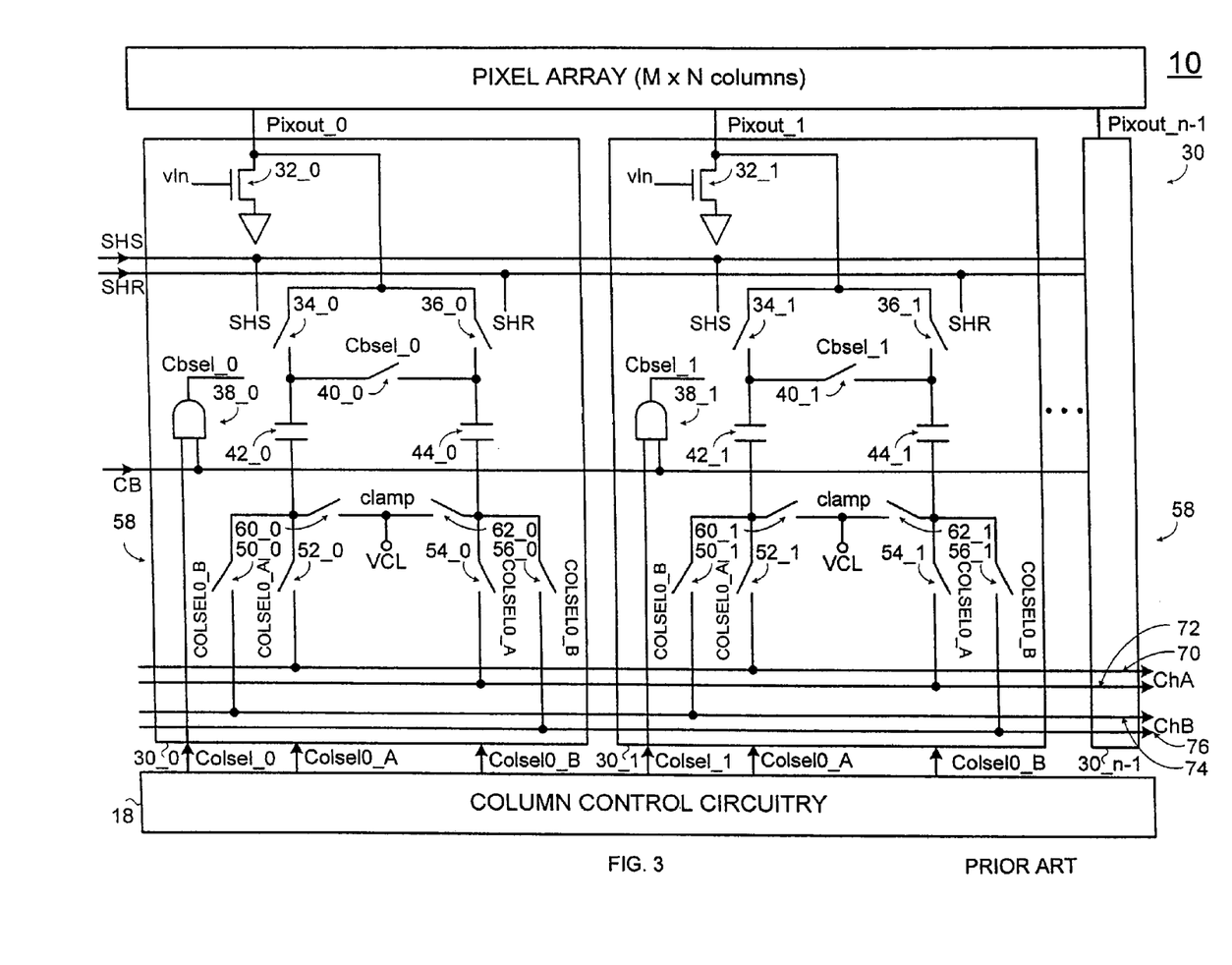
FIG. 3 illustrates a block diagram of the CMOS imager illustrated in FIG. 1.

FIG. 3 is a circuit diagram of the imager 10 illustrated in FIG. 1. The pixel array 20 comprises M rows and N columns. As can be seen in FIG. 3, the column S/H circuitry 30 comprises multiple column S/H sub-circuits 30_0, 30_1, . . . 30_n−1, one for each column in the array 20. Each sub-circuit 30_0, 30_1, . . . 30_n−1 is respectively connected to a pixel output line pixout_0, pixout_1, pixout_n−1. The first output channel ChA includes two output lines 70, 72. The second output channel ChB contains two output lines 74, 76. During operation of the imager 10, the pixel output lines pixout_0, pixout_1, . . . , pixout_n−1 carry reset and pixel signals from their respective associated pixels in the array 20.

The column control circuitry 18 provides a column 0 select signal colsel_0, column 0 green pixel select signal colsel0_A, and a column 0 red/blue select signal colsel0_B to the column 0 (first) S/H sub-circuit 30_0. Similarly, the column control circuitry 18 provides a column 1 select signal colsel_1, column 1 green pixel select signal colsel1_A, and a column 1 red/blue select signal colsel1_B to the column 1 (second) S/H sub-circuit 30_1. A global crowbar control signal CB, sample and hold pixel control signal SHS and a sample and hold reset control signal SHR are also provided to the column S/H sub-circuits 30_0, 30_1, . . . 30_n−1. The use of these signals CB, SHS, SHR are described below in more detail.

The global crowbar control signal CB is input into an AND gate 38_0 of the column 0 S/H sub-circuit 30_0. The second input of the AND gate 38_0 is connected to the column 0 select signal colsel_0. The output of the AND gate 38_0 is a crowbar control/select column 0 signal CBsel_0, which is generated only when the colsel_0 and CB signals are activated at the same time.

The column 0 S/H sub-circuit 30_0 also comprises a biasing transistor 32_0, controlled by a control voltage Vln, that is used to bias its respective pixel output line pixout_0. The pixel output line pixout_0 is also connected to a first capacitor 42_0 thru a sample and hold pixel signal switch 34_0. The sample and hold pixel signal switch 34_0 is controlled by the sample and hold pixel control signal SHS. In addition, the pixel output line pixout_0 is connected to a second capacitor 44_0 thru a sample and hold reset signal switch 36_0. The sample and hold reset signal switch 36_0 is controlled by the sample and hold reset control signal SHR. The switches 34_0, 36_0 are typically MOSFET transistors, but may also be CMOS switches.

A second terminal of the first capacitor 42_0 is connected to the first ChB pixel output line 74 via a first column select switch 50_0, which is controlled by the colsel0_B signal. The second terminal of the first capacitor 42_0 is also connected to the first ChA pixel output line 70 via a second column select switch 52_0, which is controlled by the colsel0_A signal. The second terminal of the first capacitor 42_0 is also connected to a clamping voltage VCL via a first clamping switch 60_0.

The second terminal of the second capacitor 44_0 is further connected to the second ChA pixel output line 72 via a third column select switch 54_0, which is controlled by the colsel0_A signal. The second terminal of the second capacitor 44_0 is also connected to the second ChB pixel output line 76 via a fourth column select switch 56_0, which is controlled by the colsel0_B signal. The second terminal of the second capacitor 44_0 is also connected to the clamping voltage VCL via a second clamping switch 62_0.

The four column select switches 50_0, 52_0, 54_0, 56_0 are part of a multiplexer 58, the operation of which is described below in more detail. The multiplexer 58 also comprises additional column select switches (e.g., 50_1, 52_1, 54_1, 56_1) from the remaining column S/H sub-circuits 30_1, . . . , 30_n−1. The column select switches 50_0, 52_0, 54_0, 56_0, 50_1, 52_1, 54_1, 56_1 are typically MOSFET transistors.

As is known in the art, the clamping voltage VCL is used to place a charge on the two capacitors 42_0, 44_0 when it is desired to store the pixel and reset signals, respectively from the array 20 (when the appropriate S/H control signals SHS, SHR are also generated).

Connected between the connection of the first capacitor 42_0 and its sample and hold switch 34_0 and the connection of the second capacitor 44_0 and its sample and hold switch 36_0 is a crowbar switch 40_0. The crowbar switch 40_0 is controlled by the CBsel_0 output from the AND gate 38_0. During readout of column 0, the column 0 S/H sub-circuit 30_0 is selected by the colsel_0 signal, the global crowbar control signal CB is also generated, which causes the CBsel_0 signal to be output from the AND gate 38_0. As such, crowbar switch 40_0 is closed, which shorts the front plates of the two capacitors 42_0, 44_0, driving the respective charges on these capacitors 42_0, 44_0 out to the multiplexer 58.

Similar to the column 0 S/H sub-circuit 30_0, the global crowbar control signal CB is input into an AND gate 38_1 of the column 1 S/H sub-circuit 30_1. The second input of the AND gate 38_1 is connected to the column 1 select signal colsel_1. The output of the AND gate 38_1 is a crowbar control/select column 1 signal CBsel_1, which is generated only when the colsel_1 and CB signals are activated at the same time. The remainder of the column 1 S/H sub-circuit 30_1 is essentially the same as the column 0 S/H sub-circuit 30_0. Thus, no further description of the column 1 S/H sub-circuit 30_1 is required.

Assuming that even numbered rows (e.g., Row0, Row2, etc.) have green pixels 22 (Gr) in even numbered columns (e.g., Col0, Col2, etc.) and red pixels 24 in odd numbered columns (e.g., Col1, Col3, etc.), then according to the Bayer CFA pattern, odd rows (e.g., Row1, Row3, etc.) have green pixels 28 (Gb) in the odd numbered columns and blue pixels 26 in the even numbered columns.

Referring to FIGS. 2 and 3, in operation, the signals from the pixels from Row0 are sampled onto the S/H circuitry 30 first. Even numbered column S/H circuitry (e.g., sub-circuit 30_0) will receive the signals from the green pixels 22 (Gr) from Row0. Odd numbered column S/H circuitry (e.g., sub-circuit 30_1) will receive the signals from the red pixels 24 (R) from Row0. To make sure the signals from the Row0 green pixels 22 go to the first channel ChA, and the signals from the red pixels 24 go to the second channel ChB, the multiplexer 58 described above is included within the column S/H circuitry just prior to the readout lines 70, 72, 74, 76 to the channels ChA, ChB.

Thus, during the readout operation performed on Row0, the column select switch/transistors 52_0, 54_0 connected to the first channel ChA in each even numbered column (e.g., Col0, Col2, etc.) must be selected in the multiplexer 58. In addition, during the readout operation performed on Row0, the column select switch/transistors 50_1, 56_1 connected to the second channel ChB in each odd numbered column (e.g., Col1, Col3, etc.) must be selected in the multiplexer 58.

When the Row1 signals are sampled onto the column S/H circuitry 300, 30_1, . . . , 30_n−1, the even numbered columns (e.g., Col0, Col2, etc.) will have the signals from the blue pixels 26 and the odd numbered columns (e.g., Col1, Col3, etc.) will have the signals received from the green pixels 28 (Gb). Thus, during the readout operation performed on Row1, the column select switch/transistors 52_1, 54_1 connected to the first channel ChA in each odd numbered column (e.g., Col1, Col3, etc.) must be selected in the multiplexer 58. In addition, during the readout operation performed on Row1, the column select switch/transistors 50_0, 56_0 connected to the second channel ChB in each even numbered column (e.g., Col0, Col2, etc.) must be selected in the multiplexer 58.

Signals readout onto the first channel ChA are provided to the first readout chain A (e.g., readout chain 80 of FIG. 1) for processing, which, as indicated above may include an amplifier, gain stage and an analog-to-digital converter (ADC), before being processed as digital signals by an image processor (not shown). Similarly, signals readout onto the second channel ChB are provided to the second readout chain B (e.g., readout chain 82 of FIG. 1) for processing, which, as indicated above may include an amplifier, gain stage and an analog-to-digital converter (ADC), before being processed as digital signals by an image processor (not shown). The processing of signals by the first readout chain A is independent of, and can be done in parallel with, the processing of signals by the second readout chain B.

This use of multiple readout chains decreases the time in which to process all of the signals received from a pixel array. However, this architecture has some drawbacks as each signal readout chain A, B consumes power to process the signals.

As the demand for higher resolution sensors increases, the power consumption of the imager device also increases. In certain applications, power consumption is an important design consideration. For example, in mobile applications where the supply of power may be limited, power consumption must be limited.

One approach to limiting power consumption is to provide variable sensing modes. For example, a first sensing mode includes a high resolution mode, where all of the pixels of the imager device are readout and processed. The first sensing mode is used to capture the highest resolution image. A second sensing mode includes a lower resolution mode, where only some of the pixels of the imager device are readout and processed. The second sensing mode is used for "viewfinder" (e.g., monitor) applications, where a lower resolution may be used.

However, even though power consumption is decreased by the use of a lower resolution mode, imager devices having multiple readout chains still consume a great deal of power.

Accordingly, there is a need and desire for a multiple readout chain scheme for an imager having reduced power consumption than prior art multiple readout schemes.

SUMMARY

The present invention provides a multiple readout chain architecture for an imager having reduced power consumption than currently available readout chain architectures.

The above and other features and advantages are achieved in various embodiments of the invention by providing an imager that can selectively disable/enable a readout chain and direct signals read from a pixel array to only enabled readout chains. The selective use of readout chains reduces the power consumed by the imager because it allows you to turn off a readout chain. By controlling the enablement and use of readout chains, the imager adjusts the power consumption based on the application. For instance, in a low power consumption mode, only a single readout chain is used to readout signals. Therefore, only one readout chain is enabled, all other readout chains are disabled, and signals are directed to the enabled readout chain for processing.

In another aspect of the invention, the selective use of readout chains is combined with the selective readout and processing of pixel signals to reduce power consumption.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 4:
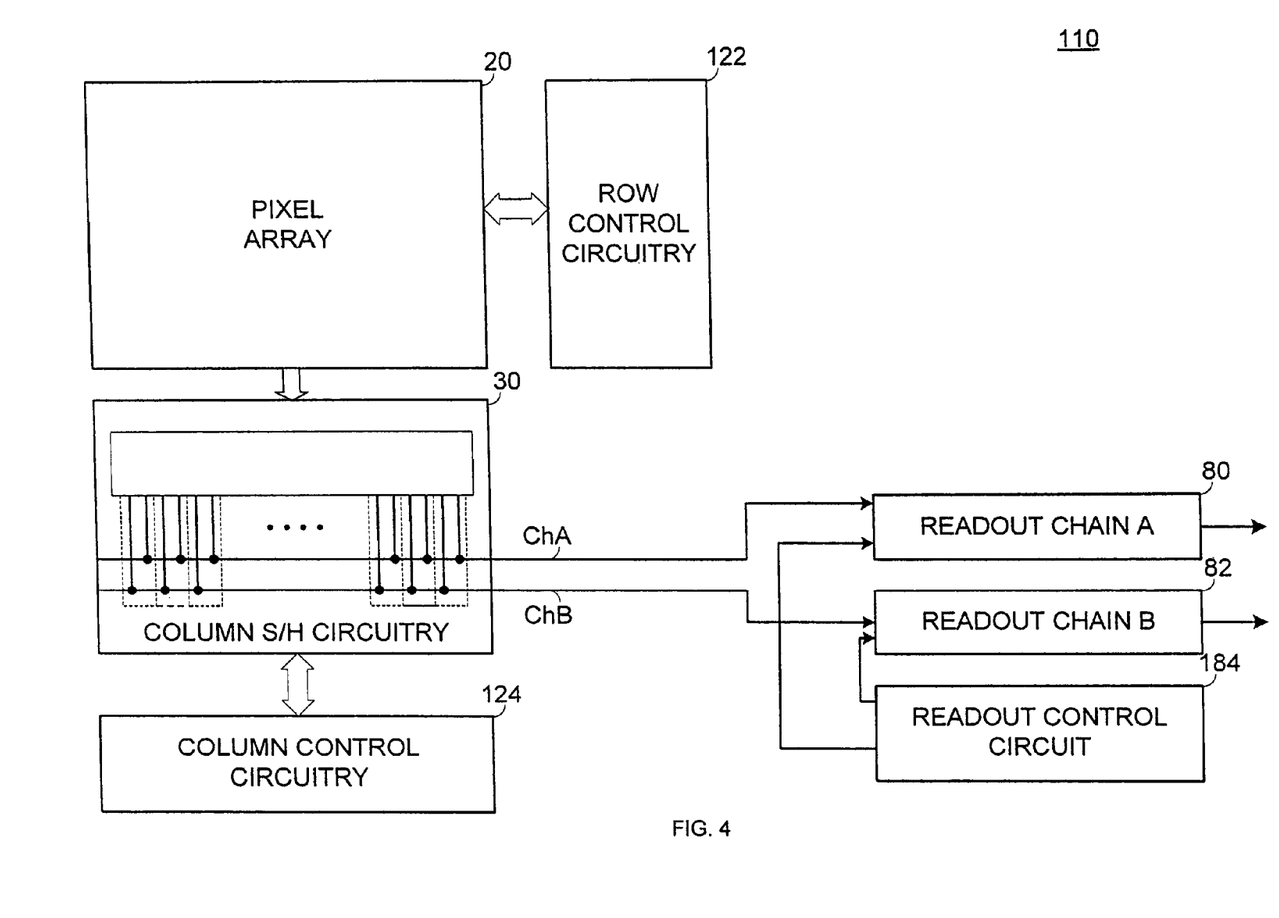
FIG. 4 illustrates a block diagram of a CMOS imager constructed in accordance with a first exemplary embodiment of the invention.

Now referring to the figures, where like reference numbers designate like elements, FIG. 4 shows a CMOS imager 110 constructed in accordance with a first exemplary embodiment of the invention. The imager 110 includes a pixel array 20, column control circuitry 124, row control circuitry 122, column S/H circuitry 30, readout control circuit 184, readout chain A 80, and readout chain B 82. The pixel signals are output from the column S/H circuitry 30 on either of two output channels ChA, ChB. As described above, each column S/H circuitry 30 selectively outputs a charge accumulated signal and a reset signal to one of either output channel ChA or ChB.

The pixel array 20 comprises M rows and N columns. The column S/H circuitry 30 comprises multiple column S/H sub-circuits (not shown) similar to those described above with respect to FIGS. 1 to 3.

The column control circuitry 124 selectively couples a column S/H circuit 30 to one of the readout chains 80, 82 through a respective channel ChA, ChB. More, specifically, the column control circuitry 124 selectively couples a sub-circuit (e.g., sub-circuit 30_0, FIG. 3) of column S/H circuit 30 to a respective channel ChA, ChB through appropriately controlling the multiplexer 58 within the sub-circuit. Further, the use of a multiplexer 58 (FIG. 3) requires minimal changes to the programming of the imager device 110 and is thus easily implemented.

As seen in FIG. 4, Readout control circuit 184 is connected to readout chains 80, 82. The readout control circuit 184 controls the operation of the readout chains 80, 82, e.g., whether a readout chain is enabled or disabled for use. That is, the readout control circuit 184 controls operation of the circuits within each of the readout chains 80, 82. For example, the readout control circuit 184 controls an amplifier, gain stage and an analog-to-digital converter (ADC) within the readout chains 80, 82. Further, the readout control circuit 184 controls the status of the readout chain 80, 82 (i.e., whether the readout chain 80, 82 is enabled or disabled for use). For example, in a standard operational mode of the imager device 110, both readout chains 80, 82 are enabled. That is, both readout chains 80, 82 process signals from column sample and hold circuitry 30. In a power saving operational mode of the imager device 110, one of the readout chains 80, 82 is enabled while the other is disabled. That is, only one of the readout chains 80, 82 processes signals from column sample and hold circuitry 30.

The column control circuit 124 incorporates the status of the readout chains 80, 82 (i.e., standard or power-saving operational mode) into the selection of which channel ChA, ChB a column S/H circuit 30. For example, when the imager device 110 is operating in a standard operational mode, both readout chains 80, 82 are enabled, and signals on channels ChA, ChB are directed to a respective readout chain 80, 82, i.e., signals from column S/H circuitry 30 carried on channel ChA are directed to readout chain 80 and signals from column S/H circuitry 30 carried on channel ChB are directed to readout chain 82.

When the imager device 110 is operating in a power saving operational mode, one of the readout chains 80, 82 is enabled and the other readout chain is disabled; signals from the column S/H circuitry 30 are coupled to the channel coupled to the active readout chain. That is, if readout chain 80 is enabled and readout chain 82 is disabled, signals from sample and hold circuitry 30 are coupled to channel ChA and provided to readout chain 80. The column control circuitry 124 controls signals such that signals from only one of the channels ChA, ChB are directed to the selected readout chain at a time. Hence, in a power saving operational mode, the column control circuitry 124 controls the multiplexer 58 to alternate between directing signals from sample and hold circuitry 30 carried on channel ChA and on channel ChB to the enabled readout chain 80, 82.

Thus with the architecture illustrated in FIG. 4, the imager 110 of the invention achieves a benefit over the typical imager 10 illustrated in FIG. 1. For example, the imager device 110 is capable of using multiple readout chains 80, 82 to provide quicker signal processing. In addition, the imager device selectively reduces the power consumption by disabling one readout chain and enabling the other readout chain when desired. This architecture is particularly advantageous in applications where the supply of power is limited and, therefore, desirable that the consumption of power is reduced.

Figure 5:
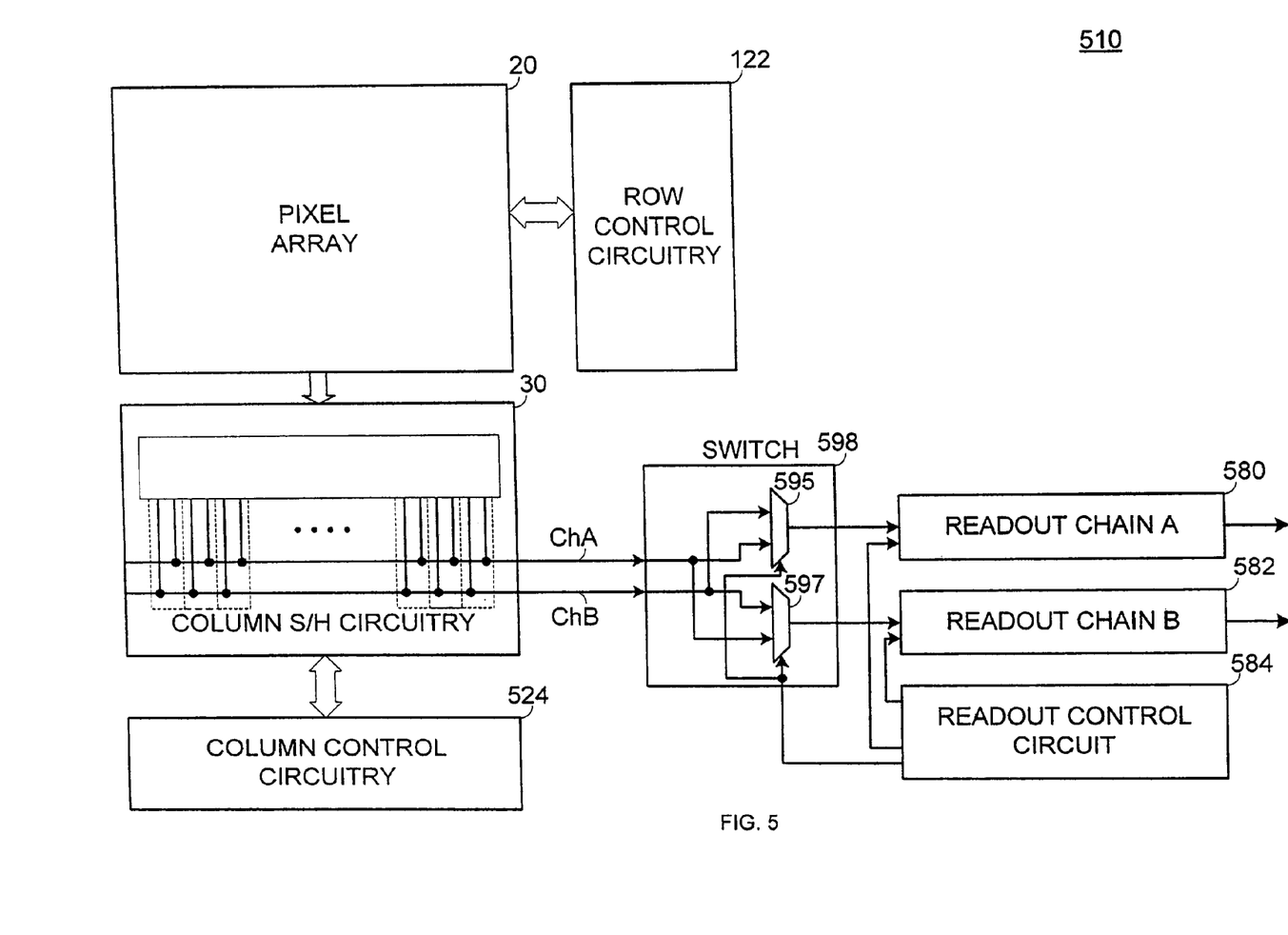
FIG. 5 illustrates a block diagram of a CMOS imager constructed in accordance with a second exemplary embodiment of the invention.

Now referring to the figures, where like reference numbers designate like elements, FIG. 5 shows a CMOS imager 510 constructed in accordance with a second exemplary embodiment of the invention. The imager 510 includes a pixel array 20, column control circuitry 524, row control circuitry 122, column S/H circuitry 30, readout control circuit 584, readout chain A 580, readout chain B 582, and a switch 598. The pixel signals are output from the column S/H circuitry 30 on either of two output channels ChA, ChB.

The pixel array 20 comprises M rows and N columns. The column S/H circuitry 30 comprises multiple column S/H sub-circuits (not shown) similar to those described above with respect to FIGS. 1 to 3.

The switch 598 contains circuitry for selectively connecting the output channels ChA, ChB from the column S/H circuitry 30 to the readout chains 580, 582. In the illustrated embodiment, the first channel ChA is selectively connected through multiplexer switch 595 to readout chain 580 and through multiplexer switch 597 to readout chain 582. Channel ChB is selectively connected through multiplexer switch 595 to readout chain 580 and through multiplexer switch 597 to readout chain 582. Although shown with two multiplexer switches 595, 597, the number of multiplexer switches is related to the number of readout chains and the number of output channels from the column S/H circuitry 30. Thus, the invention is not limited to two multiplexer switches.

Readout control circuit 584 is connected to multiplexer switch 595 and controls whether channel ChA or channel ChB is connected to readout chain 580. Further, readout control circuit 584 is connected to multiplexer switch 597 and controls whether channel ChA or channel ChB is connected to readout chain 582. The readout control circuit 584 controls whether a readout chain is enabled or disabled for use. The operation of multiplexer switch 595 and the readout control circuit 584 is described more fully below.

By placing the switch 598 between the column sample and hold circuitry 30 and the readout chains 580, 582, the imager 510 uses a simple control scheme to connect the channels ChA, ChB to the readout chains 580, 582. Further, the addition of a switch 598 requires minimal changes to the architecture of the imager device 510 and is thus easily implemented.

The readout control circuit 584 controls the operation of the readout chains 580, 582. That is, the readout control circuit 584 controls operation of the circuits within each of the readout chains 580, 582. For example, the readout control circuit 584 controls an amplifier, gain stage and an analog-to-digital converter (ADC) within the readout chains 580, 582. Further, the readout control circuit 584 controls the status of the readout chain 580, 582 (i.e., whether the readout chain 580, 582 is enabled or disabled for use). For example, in a standard operational mode of the imager device 110, both readout chains 580, 582 are enabled. That is, both readout chains 580, 582 process signals from column sample and hold circuitry 30. In a power saving operational mode of the imager device 510, one of the readout chains 580, 582 is enabled while the other is disabled. That is, only one of the readout chains 580, 582 processes signals from column sample and hold circuitry 30.

The readout control circuit 584 incorporates the status of the readout chains 580, 582 (i.e., standard or power-saving operational mode) into the control and operation of multiplexer switch 595. For example, when the imager device 510 is operating in a standard operational mode, both readout chains 580, 582 are enabled, and signals on channels ChA, ChB are directed to a respective readout chain 580, 582, i.e., signals from sample and hold circuitry 30 carried on channel ChA are directed to readout chain 580 and signals from sample and hold circuitry 30 carried on channel ChB are directed to readout chain 582.

When the imager device 510 is operating in a power saving operational mode, one of the readout chains 580, 582 is enabled and the other readout chain is disabled; signals on both channels ChA, ChB are directed to the same readout chain 580, 582. That is, if readout chain 580 is enabled and readout chain 582 is disabled, signals from sample and hold circuitry 30 carried on channel ChA are directed to readout chain 580 and signals from sample and hold circuitry 30 carried on channel ChB are also directed to readout chain 580. The readout control circuit 584 controls the switch 598 such that signals from only one of the channels ChA, ChB are directed to the selected readout chain at a time. Hence, in a power saving operational mode, the switch 598 alternates between directing signals from sample and hold circuitry 30 carried on channel ChA and on channel ChB to the enabled readout chain 580, 582.

Thus with the architecture illustrated in FIG. 5, the imager 510 of the invention achieves a benefit over the typical imager 10 illustrated in FIG. 1. For example, the imager device 510 is capable of using multiple readout chains 580, 582 to provide quicker signal processing. In addition, the imager device selectively reduces the power consumption by disabling one readout chain and enabling the other readout chain when desired. This architecture is particularly advantageous in applications where the supply of power is limited and, therefore, desirable that the consumption of power is reduced.

In another aspect of the invention, power consumption is further reduced by the selective enablement and use of the imager device's readout chains in combination with a selective readout of pixel signals from the pixel array. In a standard readout mode of an imager device having an M×N pixel array, all, or most, of the pixels are read out. In a selective readout mode, a reduced number of the pixels of the array are readout and processed. That is, in a standard read out m' rows of pixels are readout and processed, where m' is less than, or equal to, M, and in a selective readout mode, m" rows of pixels are readout and processed, where m" is less than m'. Further, in a standard read out n' columns of pixels are readout and processed, where of n' is less than, or equal to, N, and in a selective readout mode, n" columns of pixels are readout and processed, where n" is less than n'.

In a preferred embodiment, pixels signals are selected in a "skipmode" as is known in the art. A skipmode balances the desire to reduce the number of pixels that are read from the pixel array with the need to provide representative color levels and image pixels. In pixel arrays that use Bayer filters, as described above, pixels in a row of a pixel array are selected as pairs of adjacent pixels that alternate between pairs of adjacent pixels that are not selected. For example, in a pixel array having 12 rows×12 columns, pixels in columns 1, 2, 5, 6, 9, and 10 are selected for readout and pixels in columns 3, 4, 7, 8, 11, and 12 are not selected for readout. Further, only some of the rows of the pixel array are selected for readout; preferably in alternating pairs of adjacent rows. For example, rows 1, 2, 5, 6, 9, and 10 are selected for readout and pixels in rows 3, 4, 7, 8, 11, and 12 are not selected for readout. Thus, representative pixels are readout from selected columns of selected rows.

Thus with the architecture illustrated in FIG. 4 or FIG. Sand selection of a reduced number of pixels to be readout, the imager of the invention achieves a benefit over the typical imager 10 illustrated in FIG. 1. For example, in addition to the imager device selectively reducing power consumption by disabling one readout chain and enabling at least one other readout chain as indicated above, the imager device also reduces power consumption by reading out fewer than all of the pixels of the pixel array. This architecture is particularly advantageous in applications where the supply of power limited and therefore consumption of power is reduced (e.g., in mobile devices that include imagers having limited battery power).

Figure 6:
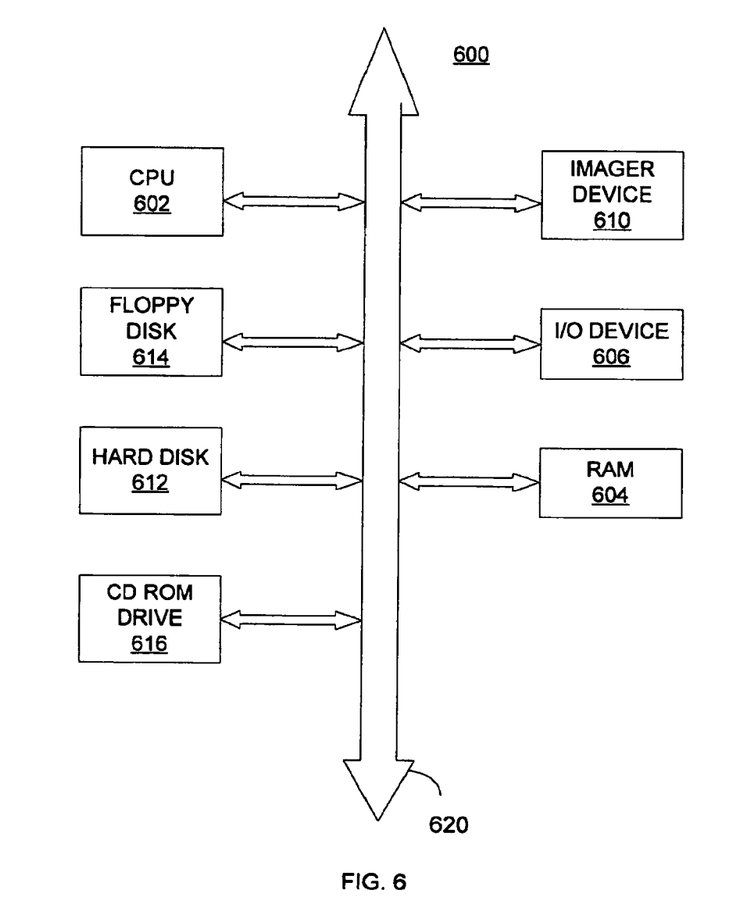
FIG. 6 shows a processor system incorporating at least one imager device constructed in accordance with an embodiment of the invention.

FIG. 6 shows system 600, a typical processor based system modified to include an imager device 610 constructed in accordance with an embodiment of the invention. That is, imager device 610 may be the device 110 described above with reference to FIG. 4 or device 510 described above with reference to FIG. 5. Examples of processor based systems, which may employ the imager device 610, include, without limitation, computer systems, camera systems, scanners, machine vision systems, vehicle navigation systems, video telephones, surveillance systems, auto focus systems, star tracker systems, motion detection systems, image stabilization systems, and others.

System 600 includes a central processing unit (CPU) 602 that communicates with various devices over a bus 620. Some of the devices connected to the bus 620 provide communication into and out of the system 600, illustratively including an input/output (I/O) device 606 and imager device 610. Other devices connected to the bus 620 provide memory, illustratively including a random access memory (RAM) 604, hard drive 612, and one or more peripheral memory devices such as a floppy disk drive 614 and compact disk (CD) drive 616. The imager device 610 may be combined with a processor, such as a CPU, digital signal processor, or microprocessor, in a single integrated circuit.

The present invention has been illustrated as having two output channels ChA, ChB. It should be appreciated that the present invention may be used with imagers having more than two channels. Essentially, all that would be required is for the switch 198 to be connected to more columns and column S/H circuitry to accommodate the extra channels. In addition, the present invention may be used with black and white and grayscale imagers having two or more output channels.

Additionally, the invention may utilize alternative circuitry for controlling/directing signals from disabled readout chains to enabled readout chains and still maintain the spirit of the invention. For example, circuits within the column sample and hold circuitry compensate for readout chains not being enabled, and direct signals on channels to enabled readout chains. Although described in reference to reducing the number of pixels read from the pixel array by utilizing a "skipmode" approach, the invention is not so limited, and alternative approaches may be utilized and still maintain the spirit of the invention.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A method of operating a camera system with a power-saving mode, said method comprising the steps of:
    using the camera system in a first mode, wherein pixel signals from an array of pixel columns are output via multiple pixel readout chains that are each coupled to said array of pixel columns through a respective readout channel of a sample and hold circuitry and through a shared switch circuitry; and
    using the camera system in a power-saving mode, wherein pixel signals from the array of pixel columns are output via only an enabled subset of said multiple pixel readout chains, said enabled subset of readout chains being less than a total of said multiple pixel readout chains, and wherein the shared switch circuitry directs pixel signals from a first readout channel and pixel signals from a second readout channel only to said enabled subset of readout chains, and wherein said shared switch circuitry alternates between directing the pixel signals from said first readout channel to said enabled subset of readout chains and directing the pixel signals from said second readout channel to said enabled subset of readout chains.

2. The method of claim 1, wherein in said first mode, each pixel column is coupled to one of said multiple pixel readout chains.

3. The method of claim 1, wherein in said power-saving mode, multiple pixel columns are coupled to a same pixel readout chain.

4. The method of claim 3, wherein said multiple pixel columns are coupled to said same pixel readout chain in response to a determination that said same pixel readout chain is said enabled subset of readout chains.

5. The method of claim 1, wherein pixel signals are read out and stored according to the pixel column from which the pixel signal was read irrespective of the pixel readout chain used during read out.

6. A method of operating a camera system with a power-saving mode, said method comprising the steps of
    in a first mode, reading out an image by reading out pixel signals associated with a first group of pixels from a pixel array using any of a first and second readout chains, the first and second readout chains each being coupled to said pixel array via respective first and second readout channels of a sample and hold circuitry and via a shared switch circuitry; and
    in a power-saving second mode, reading out an image by reading out pixel signals associated with said first group of pixels from said pixel array using an enabled one of said first and second readout chains, wherein said shared switch circuitry alternates between selectively enabling said first readout chain while disabling said second readout chain and selectively disabling said first readout chain while enabling said second readout chain, and wherein, when said first readout chain is enabled, said shared switch circuitry directs pixel signals from both of said first and second readout channels to said first readout chain and, when said second readout chain is enable, said shared switch circuitry directs pixel signals from both of said first and second readout channels to said second readout chain.

7. The method of claim 6, further comprising, in said power-saving second mode, determining which of said first and second readout chains is enabled and directing signals from said first group of pixels to the enabled of said first and second readout chains.

8. The method of claim 6, wherein a second group of pixels is a subset of said first group of pixels, and only the second group of pixels is readout in said power-saving second mode.

9. The method of claim 6, further comprising, in said power-saving second mode, reading pixel signals from less than all of the columns of said pixel array.

10. The method of claim 6, further comprising, in said power-saving second mode, reading pixel signals from less than all rows of said pixel array.

11. The method of claim 6, further comprising, in said power-saving second mode, reading pixel signals from alternating adjacent pairs of columns of said pixel array.

12. The method of claim 6, further comprising, in said power-saving second mode, reading pixel signals from alternating adjacent pairs of rows of said pixel array.

13. The method of claim 12, further comprising, in said power-saving second mode, reading pixel signals from alternating adjacent pairs of columns of said pixel array.

14. A method of operating a camera system with a power-saving mode, said method comprising the steps of:
  using the camera system in a first mode, wherein the steps of using the camera system in the first mode comprise:
    transferring pixel signals from an array of pixel columns to first and second readout channels of a sample and hold circuitry;
    transferring pixel signals from said first and second readout channels of said sample and hold circuitry through a connection to respective first and second pixel readout chains; and
    using said first and second pixel readout chains to output the pixel signals; and
  using the camera system in a power-saving mode, wherein the steps of using the camera system in the power-saving mode comprise:
    transferring pixel signals from the array of pixel columns to said first and second readout channels of said sample and hold circuitry;
    switching the connection between said sample and hold circuitry and the first and second pixel readout chains so that both said first and second readout channels of said sample and hold circuitry are alternately connected to either the first pixel readout chain only or to the second pixel readout chain only;
    transferring pixel signals from said first and second readout channels of said sample and hold circuitry through the connection to the connected pixel readout chain; and
    using the connected pixel readout chain to output the pixel signals.

15. The method of claim 14, wherein the steps of using the camera system in a power-saving mode further comprise:
  transferring pixel signals from less than all rows of said array of pixel columns.

16. The method of claim 14, wherein the steps of using the camera system in a power-saving mode further comprise:
  transferring pixel signals from less than all of the columns of said array of pixel columns.

* * * * *

UNITED STATES PATENT AND TRADEMARK OFFICE
CERTIFICATE OF CORRECTION

PATENT NO. : 8,314,867 B2
APPLICATION NO. : 12/603151
DATED : November 20, 2012
INVENTOR(S) : Sandor L. Barna et al.

It is certified that error appears in the above-identified patent and that said Letters Patent is hereby corrected as shown below:

In column 10, line 55, in Claim 6, delete "steps of" and insert -- steps of: --, therefor.

Signed and Sealed this
Twenty-ninth Day of January, 2013

David J. Kappos
*Director of the United States Patent and Trademark Office*